J. E. WYCKOFF.
LIFE SAVING FENDER.
APPLICATION FILED DEC. 27, 1921.
1,421,650.
Patented July 4, 1922.
2 SHEETS—SHEET 1.
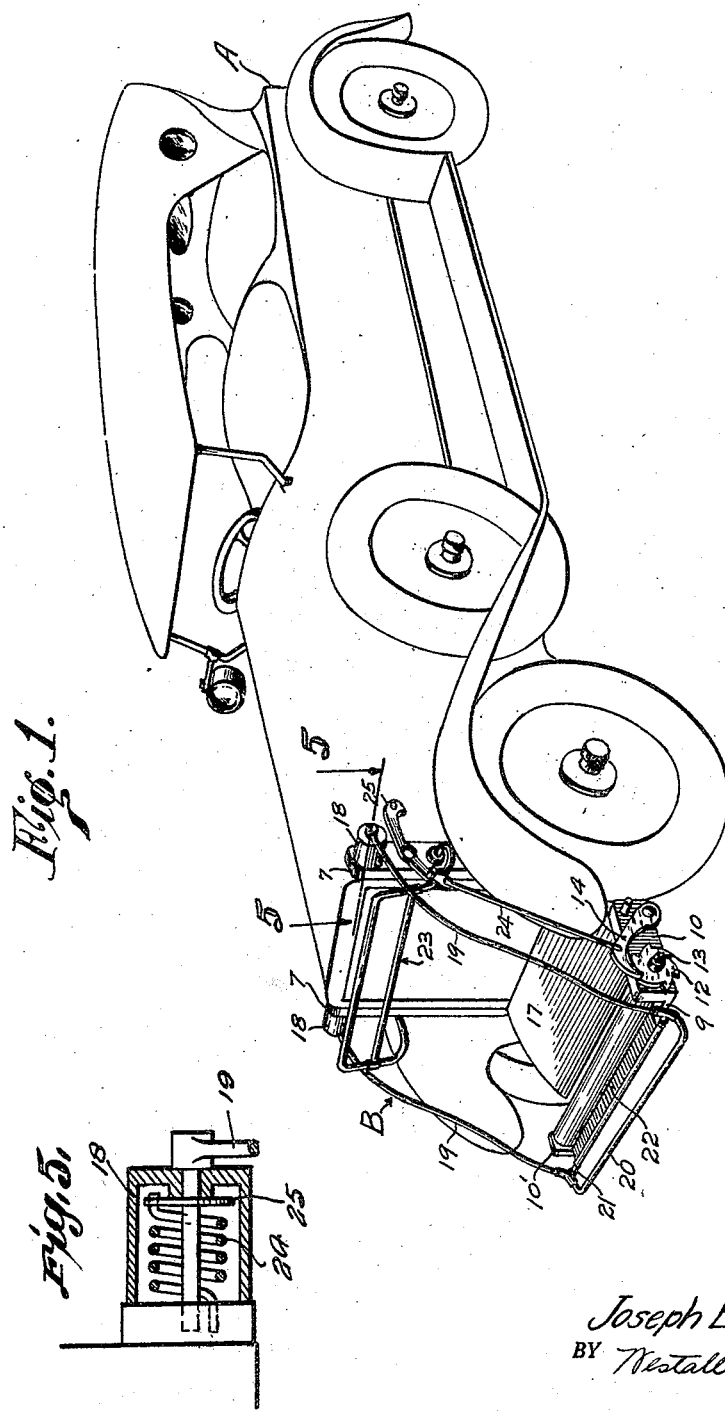
INVENTOR.
Joseph E. Wyckoff
BY Westall and Wallace
ATTORNEYS.

J. E. WYCKOFF.
LIFE SAVING FENDER.
APPLICATION FILED DEC. 27, 1921.
1,421,650.
Patented July 4, 1922.
2 SHEETS—SHEET 2.
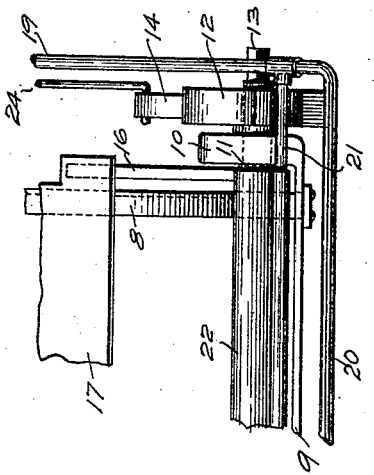
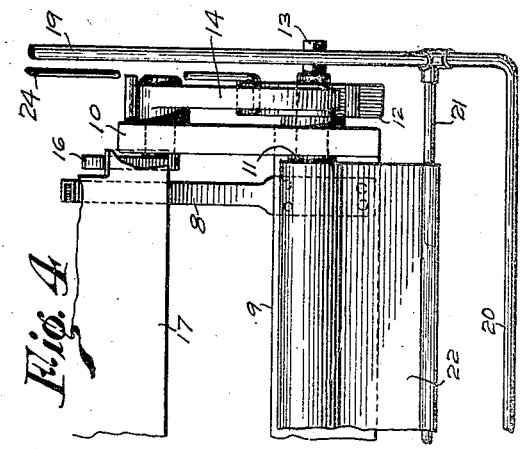
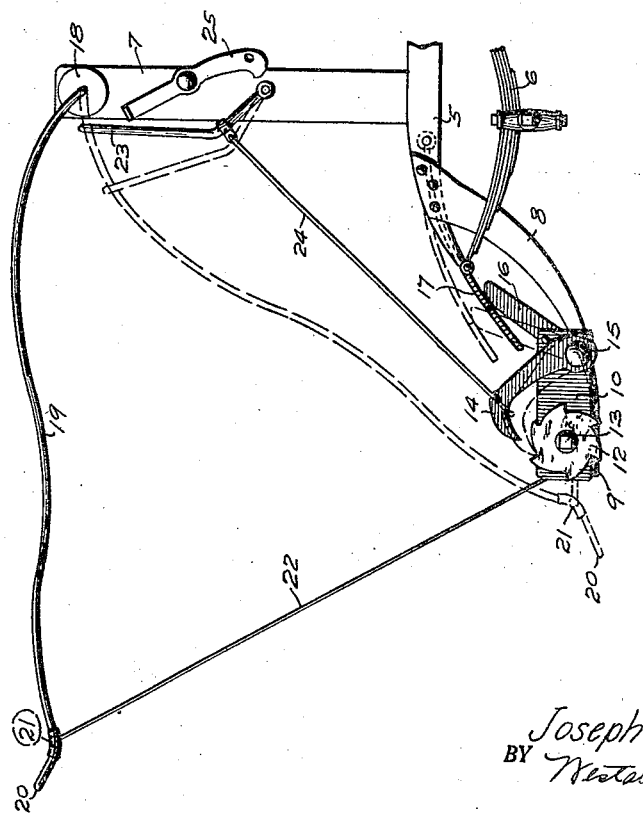
INVENTOR.
Joseph E. Wyckoff
BY Westall and Wallace
ATTORNEYS.

UNITED STATES PATENT OFFICE.

JOSEPH E. WYCKOFF, OF LOS ANGELES, CALIFORNIA, ASSIGNOR OF ONE-HALF TO DAVID B. WYCKOFF, OF GLENDALE, CALIFORNIA.

LIFE-SAVING FENDER.

1,421,650.      Specification of Letters Patent.      Patented July 4, 1922.

Application filed December 27, 1921. Serial No. 524,889.

*To all whom it may concern:*

Be it known that I, JOSEPH E. WYCKOFF, a citizen of the United States, and resident of Los Angeles, in the county of Los Angeles, State of California, have invented new and useful Improvements in a Life-Saving Fender, of which the following is a specification.

This invention relates to a device for attachment to the front of a vehicle to prevent injury to a person with whom the vehicle may collide.

Investigation of automobile accidents has shown that in the case of the collision of an automobile with a pedestrian, the greatest damage results from the pedestrian being thrown forward of the vehicle and upon the ground. It is seldom that the vehicle runs over the body of the individual with whom it collides, and the impact of the vehicle with the body seldom results in injury to the head, whereas the persons so injured generally suffer the greatest damage to their heads. The individual when thrown to the ground is injured by the impact of his head with the pavement. The primary object of this invention is to provide a device which will prevent the pedestrian from being thrown to the pavement on collision with the vehicle. Another object of this invention is to provide a fender which will accomplish the above mentioned objects and will not detract from the appearance of the vehicle.

These objects together with other objects and corresponding accomplishments are obtained by means of the embodiment of my invention illustrated in the accompanying drawing, in which:

Fig. 1 is a perspective view of an automobile with my improved fender attached thereto; Fig. 2 is an enlarged side elevation of a fragment of the automobile with the fender; Fig. 3 is a front elevation of a fragment of the fender to show details thereof; Fig. 4 is a plan view of the fragment shown in Fig. 3; Fig. 5 is an enlarged section as seen on the line 5—5 of Fig. 1.

Referring more particularly to the drawing, A indicates an automobile of a well known type with the fender B attached thereto at the front. Referring more particularly to Fig. 2, a front horn of the frame is indicated by 5, the spring 6 being secured thereto in the usual manner. Secured to the frame and at each side of the hood at the front of the automobile are standards 7. Depending from the horns 5 at the sides of the frame are brackets 8. Bolted, riveted or otherwise secured to the bracket 8 is a cross-piece or bar 9 having at its end plates 10 and 10' preferably formed integral therewith.

Journalled in plates 10 and 10' is a roller 11. Fixed to one trunnion is a ratchet wheel 12, the trunnion being extended and having a squared end 13. Pivoted on the plate 10 is a pawl 14 for engagement with the ratchet wheel. The pawl 14 is fixed to the pivot shaft 15 and at the other end thereof has secured thereto a trigger arm 16. A seat 17 is pivoted at one edge between the horns 5 of the frame, the other edge thereof resting upon the trigger arm 16 so that pressure downwardly upon the seat tends to swing trigger arm 16 and lift pawl 14 from the teeth of the ratchet wheel.

Secured adjacent the top of the standards 7 are casings 18 containing spiral springs 24 fixed against rotation at one end and at the other to a washer 25 fixed to a shaft 26 to which arm 19 is attached tending to swing arms 19 upwardly into the position shown in full lines in Fig. 2. A guard bar 20 connects the outer end of the arms 19, and a cross-bar 21 has secured thereto a flexible curtain 22 arranged to be wound upon the roller 11. When pawl 14 is released or raised from ratchet wheel 12, the springs in casings 18 will lift the arms 19 and unroll curtain 22 as shown in full lines in Fig. 2.

Pivoted on the standard 7 is a head guard 23. Headguard 23 is arranged at such height that for the average person it will be at the height of his head, when he is seated upon the seat 17. Secured to one arm of the headguard 23 is a link 24 which is attached at the other end to the pawl. Thus, if the head guard 23 is swung from the position shown in dotted lines in Fig. 2 to the position shown in full lines, it will lift the pawl 14. To provide means to lock the pawl against the ratchet wheel so that it cannot be raised therefrom, a stop 25 is pivoted on a standard 7. This stop is so arranged that when swung into position shown in Fig. 1, it will prevent the headguard from being moved toward the vehicle and thereby prevent the pawl 14 from being lifted. When the stop is in the position shown in Fig. 2, the pawl is free to be lifted.

Normally the parts are in the position shown in Fig. 1 in full lines and in dotted lines in Fig. 2. A crank handle, not shown, having a socket is engaged with the end 13 of the roller trunnion and the curtain wound thereon until the position shown in Fig. 1 has been reached. Pawl 13 is engaged with the ratchet wheel to hold the curtain against being unwound. The weight of seat 17 is not sufficient to raise the pawl. Stop 25 is placed in the position shown in Fig. 2. In the event of the vehicle colliding with a person, the guard bar 20 strikes him below the knees and therefore below his center of gravity. This upsets the person and he is projected upon the seat 17 or his head strikes against the headguard 23. Sufficient pressure upon the seat 17 or against the headguard 23 will cause the pawl 14 to be lifted, permitting the arms 19 to be raised and the curtain 22 to be drawn in front of the individual preventing him from being projected forwardly and onto the pavement. The arms 19 may be bent in such a way as to tend to scoop the person upon the seat 17 in case he or she is near the outside line of the vehicle.

What I claim is:

1. In combination with a vehicle, a device of the character described comprising a flexible curtain, means to secure said curtain to the front of the vehicle adjacent the ground, said means being arranged to hold said curtain folded, and means operated by collision of a person with the front of a vehicle to draw said curtain across the front of the vehicle to prevent said person from being projected forwardly.

2. In combination with a vehicle, a device of the character described comprising a flexible curtain, means to secure said curtain to the front of the vehicle adjacent the ground, said means being arranged to hold said curtain folded, arms secured to the free ends of said curtain, means tending to swing said arms upwardly to spread said curtain in front of the vehicle to prevent a person collided with from being projected forwardly, buffer means for holding said curtain folded, said buffer means being arranged to release said curtain upon contact with a person.

3. In combination with a vehicle, a device of the character described comprising a flexible curtain, a roller at the front of the vehicle adjacent the ground, said curtain being secured to said roller and wound thereon, and means operated by collision of a person with the front of the vehicle to draw said curtain across the front of the vehicle to prevent said person from being projected forwardly.

4. In combination with a vehicle, a device of the character described comprising a flexible curtain, a roller at the front of the vehicle adjacent the ground, said curtain being secured to said roller and wound thereon, arms secured to the free end of said curtain, means tending to swing said arms upwardly to spread said curtain in front of the vehicle to prevent a person collided with from being projected forwardly, buffer means for holding said curtain wound upon said roller, said buffer means being arranged to release said curtain upon contact with a person.

5. In combination with a vehicle, a device of the character described comprising a roller mounted upon the front of said vehicle adjacent the ground, a ratchet wheel fixed to said apron, a flexible curtain secured at one end to said roller and arranged to be wound thereon, arms secured to the free end of said curtain, means tending to swing said arms upwardly and spread said curtain in front of the vehicle to prevent a person collided with from being projected forwardly, buffer means arranged to be engaged by the person collided with, a pawl engaged with said ratchet wheel to hold the latter against rotation, and means connecting said buffer and said pawl so that upon movement of said buffer said pawl will be raised to release said ratchet wheel whereby said arms may draw said curtain upwardly in front of the vehicle to prevent the person collided with from being projected forwardly.

In witness that I claim the foregoing I have hereunto subscribed my name this 14th day of December, 1921.

JOSEPH E. WYCKOFF.